Feb. 14, 1967  J. M. BROWN ETAL  3,304,124
TIRE RIM MOUNTING MEANS AND METHOD
Filed April 29, 1965  2 Sheets-Sheet 1
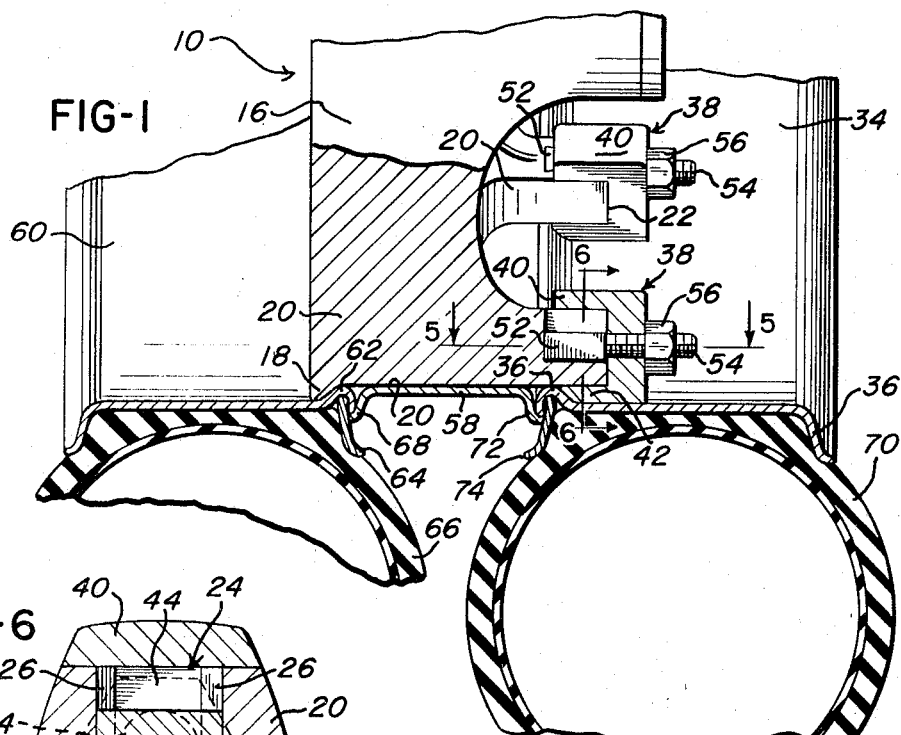
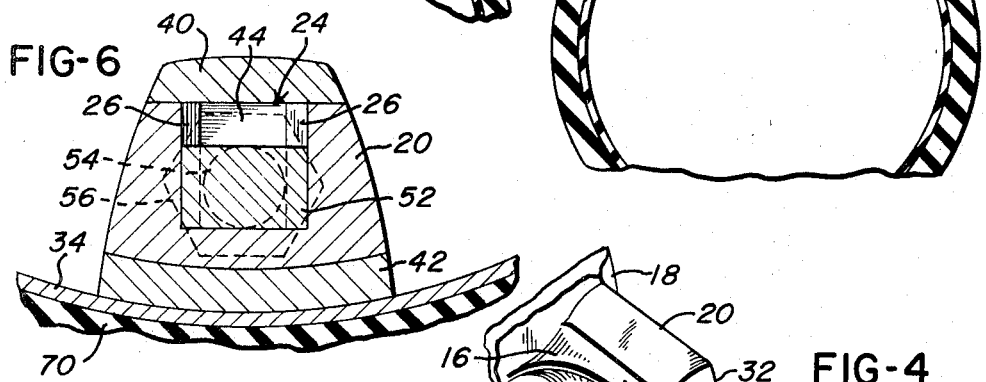
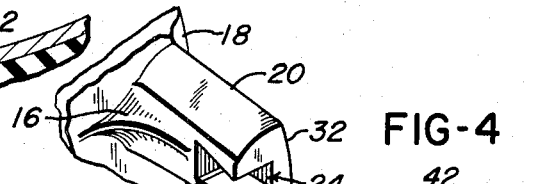
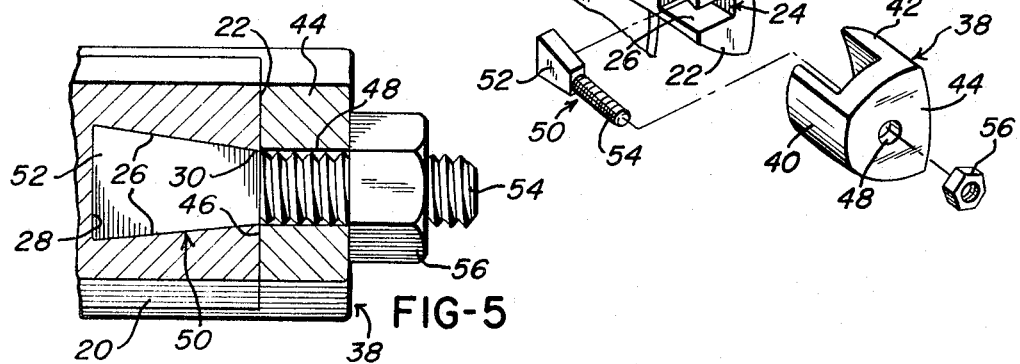
INVENTORS
JUNIOR M. BROWN
GEORGE E. YORK
BY
Cawdr & Cawdr
THEIR ATTORNEYS

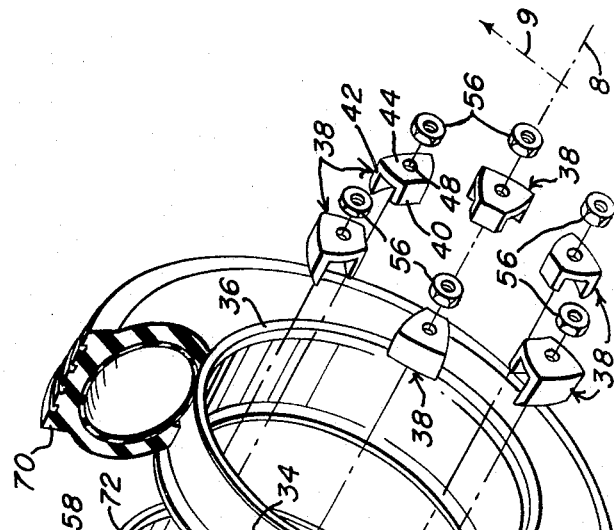
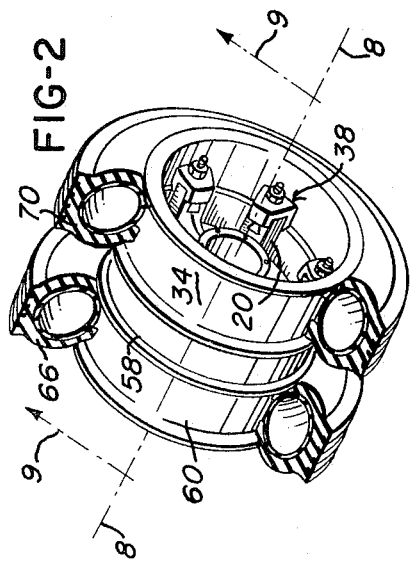
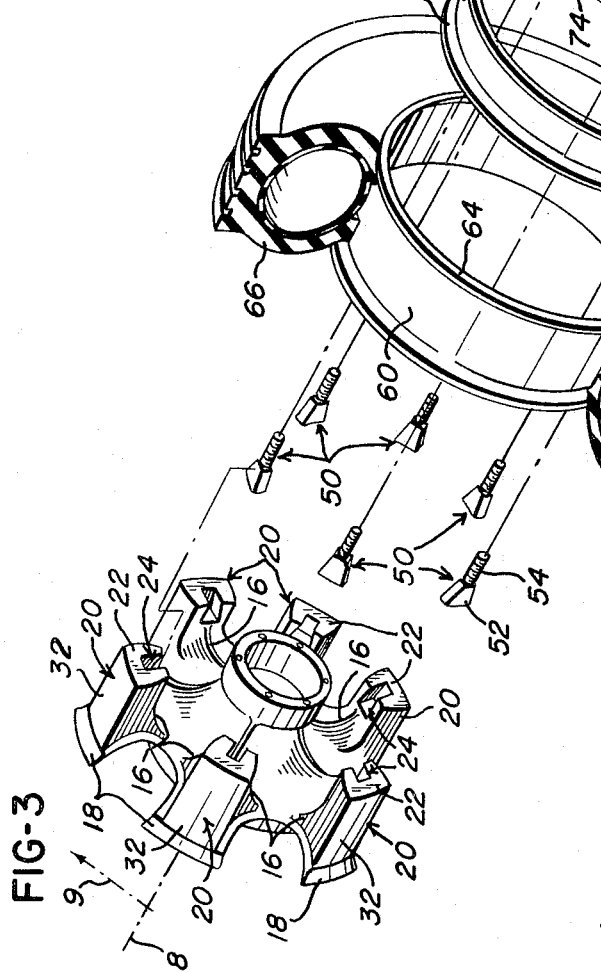
Feb. 14, 1967  J. M. BROWN ETAL  3,304,124
TIRE RIM MOUNTING MEANS AND METHOD
Filed April 29, 1965  2 Sheets-Sheet 2
INVENTORS
JUNIOR M. BROWN
GEORGE E. YORK
BY
THEIR ATTORNEYS

United States Patent Office 3,304,124
Patented Feb. 14, 1967

3,304,124
TIRE RIM MOUNTING MEANS AND METHOD
Junior M. Brown, 4319 Queens Ave., Dayton, Ohio 45406, and George E. York, Madison Township, Montgomery County, Ohio (634 N. Union Road, Dayton, Ohio 45427)
Filed Apr. 29, 1965, Ser. No. 451,840
9 Claims. (Cl. 301—12)

One of the features of this invention relates to a tire rim mounting means having inner bolt receiving slots with means to lock the bolt heads of the bolts which are secured to the tire rims, such as by tapered side walls in combination with cooperating bolts having wedge-shaped heads located in such slots, such bolts passing through U-shaped tire rim clamps, which are secured in place by fasteners or bolt nuts at the ends of the bolts, which bolts pass through the tire rim clamps.

Another feature of this invention includes a hub to be attached to an axle of a vehicle with the hub having radial spokes with each spoke having fingers extending axially outward from the vehicle, the fingers having radially inner axial bolt head receiving finger slots, which receive the bolt heads, such as wedge-shaped bolt heads of bolts which extend from such fingers through rim clamps which hold the rims on the fingers, the bolts passing through the rim clamps, and holding the rims in place by fasteners or bolt nuts secured to the ends of the bolts.

Another feature of this invention includes the use of a securely held bolt which is loosely inserted into the tire rim mounting fingers of the hub, the construction being such that tightening of the bolt nut will automatically cause the various parts to be tightly secured together in a novel manner.

Another feature of this invention includes the application of the foregoing features to a double rim construction.

Another feature of this invention includes a novel method of mounting tire rims on axle hubs in the simple and effective manner.

Other features of this invention are apparent from this description, the appended claimed subject matter, and/or the accompanying drawings in which:

FIGURE 1 is a radial cross section of a portion of the hub, tire rim, and tire construction of this invention.

FIGURE 2 is a perspective view, partly in cross section, showing the tire, rim, spacer, and hub construction assembled together.

FIGURE 3 is an exploded perspective view of the various parts of this invention shown in FIGURE 2.

FIGURE 4 is an exploded perspective view of one finger, bolt, and rim clamp construction of this invention.

FIGURE 5 is an enlarged cross section taken substantially along the line 5—5 of FIGURE 1.

FIGURE 6 is a cross section taken substantially along the line 6—6 of FIGURE 1.

Certain words are used in the specification and claims which indicate direction, relative position, etc. These words are used for the sake of clarity and brevity, but it is to be understood that these words are used only in connection with the illustrations in the drawings, and that in actual use, the parts described by such words may have entirely different relative positions, direction, etc. Also, the words "axial" or "axially" as used herein, are intended to indicate directions which may be identical with, or parallel to, the central axis of the wheel construction, as indicated by the dotted axial line 8—8 in FIGURES 2 and 3. Also, the words "radial" or "radially" are used herein to indicate directions which extend radially from the wheel axis 8—8, as indicated by the radial lines 9. Also, the word "inward" or "inwardly" is used herein sometimes to indicate a direction radially inward toward the axis 8—8. At other times, depending on the context of the sentence, such word "inward" or "inwardly" is intended to indicate a direction inward toward the center of the vehicle along the shaft upon which the wheel construction is mounted. The words "outward" or "outwardly" are intended to indicate directions which are opposite to the directions described in connection with the words "inward" or "inwardly."

A wheel construction, according to this invention, which is suitable for use in connection with any tire rim mounted vehicle, may include a hub 10 to be attached to an axle construction of a vehicle, either at the front axle or axles, or the rear axle or axles.

The hub 10 may have a central cylindraceous central portion with a central axis 8, and having radial spokes 16 extending from such central cylindraceous portion. The radial spokes 16 may have individual tapered flanges 18 extending axially inward at the ends of the spokes 16. The spokes 16 also may have cylindrically arranged, axially outward fingers 20 on the radially outer ends of the spokes 16. The fingers 20 may have transverse finger end surfaces 22.

The fingers 20 may have radially inner axially tapered bolt receiving finger slots 24, with tapered side walls 26. The slots 24 may have axially inner relatively broad slot ends 28 and may have axially outer relatively narrow slot ends 30. The fingers may have tire receiving arc-shaped radially outer finger felly surfaces 32.

The words "relatively broad" and "relatively narrow" are intended to indicate a relationship between the broad and narrow ends of the slots 24, without reference to any particular datum as to the actual size, as measured in inches or the like, since such datum size may vary considerably, in accordance with the size of the wheel and the like.

A tire rim 34 may have one rim end 36 which extends around the fingers 20 closely adjacent to the outer finger felly surfaces 32.

Tire rim U-shaped clamps 38, may each have a radially inner leg 40 and a radially outer leg 42. These legs 40 and 42 may straddle a respective finger 20. The clamp 38 may have an axially extending clamp base 44 having a transverse axially inner clamp surface 46 which engages a respective finger end surface 22 as shown in FIGURE 5.

A bolt hole 48 in said clamp base 44 may be axially aligned with a respective one of said finger slots 24.

Axially directed bolts 50 may each have a bolt wedge-shaped head 52 in each one of the said respective finger slots 24. Each bolt 50 may extend axially and loosely through a respective bolt hole 48, and has a respective bolt end 54 extending axially beyond the respective clamp base 44. A bolt end fastener 56, such as an internally threaded bolt nut, may each be fastened to a respective bolt end 54 to move secure the respective clamp 38 against a respective one of the finger end surfaces 22.

Thus said fingers 20 may each have a bolt head receiving slot 24, each slot engaging and disengaging a bolt head 52 of a bolt 50 by radially outward lateral or radially inward lateral movement of said bolt head 52 into or out of said slot 24. The slot 24 and bolt head 52 have bolt head rotation preventing and bolt head axial movement locking constructions or means, such as the wedged shaped constructions previously described. The bolt heads 52 are movable into or out of the slots 24 by radial and lateral movement of the bolt heads 52 and of the bolts 50. The bolt heads 52 and bolts 50 can easily be moved into or out of the slots 24 by a simple lateral movement of the bolts 50 and the bolt heads 52.

The wheel construction may have a tire rim spacer band 58 which the arc-shaped outer finger felly surfaces 32 contact at one end 36 of the tire rim 34. A second tire rim 60 may be provided which the arc-shaped outer finger felly surfaces 32 also contact, and which second tire rim 60 is spaced from the first-named tire rim 34 by the spacer band 58.

The fingers 20 may have individual tapered axially inward flanges 18 at the axially inner ends of the arc-shaped felly surfaces 32. These tapered flanges 18 engage a radially inward circumferential bead 62 of the tire rim 60. The inner flanges 18 hold the second rim 60 against inward movement toward the center of the vehicle. The bead 62 cooperates with the tire holding ring 64, to hold the inner tire 66 on the rim 60. The band 58 has an inner flange 68, which cooperates with the inner or second tire rim 60 properly to engage each other, as is well known in the art.

The first tire rim 34 also has a radially inward circumferential bead 36 which is engaged by the outer legs 42 of the clamps 38, by a wedging action of the wedge-shaped ends of the outer legs 42. This wedging action properly aligns and centers the cooperating parts in an improved manner.

The bolt nuts 56 may be tightened against the clamp base 44, to push the holder legs 42 against the bead 36 of the outer rim 34. The construction is such that no close tolerances are required between these cooperating parts.

The method of assembling the tire construction of this invention may, for example, include placing the tire rim spacer 58 against the end of the rim 60 either before or after rim 60 has been mounted around the hub 10 by leftward axial movement of the rim 64 toward the hub, FIGURE 3. The spacer 58 is then mounted around the hub 10 by similar leftward axial movement against the rim 60. The rim 60 and spacer 58 may be preliminarily telescoped together before mounting them on the hub, or they may be serially mounted on the hub, as desired.

The outer rim 34, with its tire 70, may then be mounted on the hub 10 with the flange 72 of the spacer 58 against the inner end of the rim 34 and engaging the bead 36 of the rim 34. The rim 34 has a tire holding ring 74, similar to ring 64 of rim 60, and these parts cooperate together in a well known manner.

The bolts 50 are individually placed in their respective slots 24, and the clamps 38 are initially serially held loosely in place by initially loosely tightening the bolt nuts 56, as they are placed around the circumference of the hub 10. Thereafter, the nuts 56 are tightened serially and gradually, so that the tire rims 34 and 60 are securely held in place on the hub 10. Because of the slight give of the parts which are tightened along with the bolts 50, these parts gradually interlock with each other to hold the rims 34 and 60 securely in place. The parts cooperate and engage each other firmly by the gradual wedging action of the parts.

A new, useful and unobvious wheel construction and method of mounting the wheel parts have thus been provided.

While the form of the invention now preferred has been disclosed as required by the statutes, other forms may be used, all coming within the scope of the claims which follow.

What is claimed is:
1. In combination:
   a hub to be attached to an axle construction of a vehicle and having a central cylindraceous portion with a central axis and having radial spokes extending from said cylindraceous portion, said spokes having individual axially outward fingers on the radially outer ends of said spokes, said fingers having transverse finger end surfaces, said fingers having radially inwardly open axially tapered bolt receiving finger slots with tapered side walls, said slots having axially inner relatively broad slot ends and having axially outer relatively narrow slot ends, said fingers having tire rim receiving arc-shaped radially outer finger felly surfaces;
   a tire rim having one rim end extending around said fingers closely adjacent said outer finger felly surfaces;
   tire rim U-shaped clamps each having radially inner and radially outer legs straddling a respective finger and having an axially extending clamp base having a transverse axially inner clamp surface engaging a respective finger end surface and having a bolt hole axially aligned with a respective said finger slot;
   axially directed bolts each having a wedge-shaped bolt head in a respective said finger slot, each said bolt head extending axially through a said respective bolt hole and having a respective bolt end extending axially beyond a respective clamp base, said bolt head being laterally and radially insertable into and removable from said respective finger slot;
   and bolt end fasteners each fastened to a respective said bolt end and securing a respective said bolt end and securing a respective said clamp on a respective said finger.

2. A combination according to claim 1 having a tire rim spacer band which said arc-shaped outer finger felly surfaces also contact at one end of said tire rim.

3. A combination according to claim 2 having a second tire rim which said arc-shaped outer finger felly surfaces also contact and which second tire rim is spaced from said first named tire rim by said band.

4. A combination according to claim 3 in which said fingers have individual tapered axially inward flanges at the axially inner ends of said arc-shaped felly surfaces, said tapered flanges engaging a radially inward circumferential bead on said second tire rim.

5. A combination according to claim 4 in which said first named tire rim has a radially inward circumferential bead which is engaged by said outer legs of said clamps.

6. A combination according to claim 1 in which said bolt ends are threaded ends and said end fasteners are internally threaded nuts threaded on said threaded bolt ends.

7. In combination:
   a hub to be attached to an axle construction of a vehicle and having a central cylindraceous portion with a central axis and having means to hold individual axially outward cylindrically arranged fingers around said axis, said fingers having transverse finger end surfaces, said fingers having radially inner bolt head receiving, rotationally and axially locking slots, said fingers having tire rim receiving arc-shaped radially outer felly surfaces;
   a tire rim having one rim end extending around said fingers closely adjacent said outer finger surfaces;
   tire rim U-shaped clamps, each having radially inner and radially outer legs adjacent respectively to said locking slots and said outer felly surfaces on a respective finger and having an axially extending clamp base engaging a said transverse finger end surface and having a bolt hole axially aligned with a respective said finger slot;
   axially directed bolts each having a bolt head in said bolt head receiving, rotationally and axially locking slot, said bolt extending axially along said slot and through a respective said bolt hole in a respective clamp base and having a respective bolt end extending axially beyond said respective clamp base, said bolt head being laterally and radially insertable into and removable from said locking slot;
   and bolt end fasteners each fastened to a respective said bolt end and securing a respective said clamp on a respective said finger.

8. A method of mounting a wheel construction on a hub, which comprises assembling:
   a first tire rim against an inner flange portion of the hub;
   a tire spacer band against the outer edge of said first named tire rim;
   a second tire rim against the outer end of said rim spacer, and about a finger construction of said hub;
inserting wedge-shaped heads of bolts radially outwardly and laterally into tapered slots of said fingers of said hub, with the bolt ends extending axially outwardly of the finger ends;
placing U-shaped tire rim clamps over said finger ends, with said bolt ends protruding out of the bases of said U-shaped tire rim clamps;
and tightening bolt nuts on said bolts, and against said bases of said tire clamps in a gradual manner, to secure the rims tightly on the hub.

9. A method of mounting a wheel construction on a hub, which comprises assembling:
a first tire rim against an inner flange portion of the hub;
a tire spacer band against the outer edge of said first named tire rim;
a second tire rim against the outer end of said rim spacer, and about a finger construction of said hub;
inserting locking bolt heads radially outwardly and laterally into bolt head locking slots of said fingers of said hub, with the bolt ends extending axially outwardly of the finger ends;
placing U-shaped tire rim clamps over said finger ends with said bolt ends protruding out of the bases of said U-shaped tire rim clamps;
and tightening bolt end fasteners on said bolt ends, and against said bases of said tire clamps.

References Cited by the Examiner

UNITED STATES PATENTS 1,689,650  10/1928  Waggenhorst _____ 301—13
3,142,516  7/1964  Durham _____ 301—13

MILTON BUCHLER, *Primary Examiner.*

RICHARD J. JOHNSON, *Examiner.*